C. O. BODE.
ANTISKID DEVICE FOR VEHICLE TIRES.
APPLICATION FILED FEB. 18, 1921.
1,429,837.                                             Patented Sept. 19, 1922.
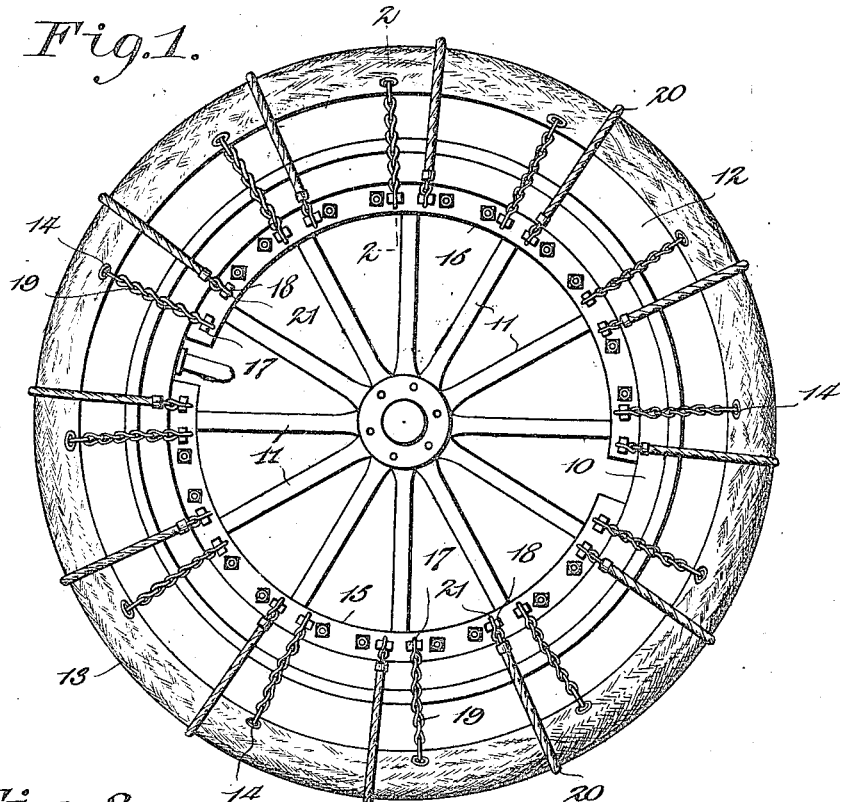
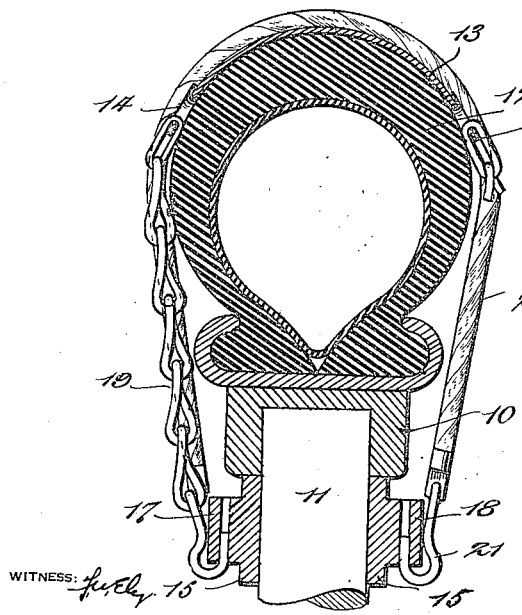
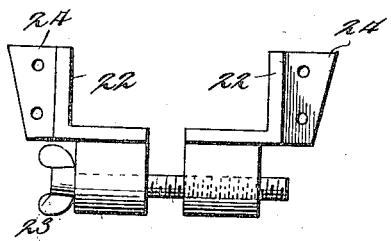
Charles O. Bode, INVENTOR
BY Victor J. Evans ATTORNEY Patented Sept. 19, 1922.

1,429,837

UNITED STATES PATENT OFFICE.

CHARLES O. BODE, OF NEW YORK, N. Y.

ANTISKID DEVICE FOR VEHICLE TIRES.

Application filed February 18, 1921. Serial No. 445,979.

*To all whom it may concern:*

Be it known that I, CHARLES O. BODE, citizen of the United States, residing at New York city, in the county of New York and State of New York, have invented new and useful Improvements in Antiskid Devices for Vehicle Tires, of which the following is a specification.

This invention relates to improvements in anti-skid devices for vehicle tires, and one of the principal objects is to provide a fabric shoe to be secured to the tire for this purpose.

Another object is to provide improved clamping means for connection to the wheel to hold the shoe in place.

Another object is to provide improved means to take the place of the usual chains.

With these and other objects in view which will be more apparent as the specification proceeds, the invention resides in certain novel construction and combination and arrangement of parts, the essential features of which are hereinafter fully described, are particularly pointed out in the appended claims, and are illustrated in the accompanying drawing, in which :—

Figure 1 is a side elevation of an automobile wheel showing my improvements in place.

Figure 2 is a sectional view in line 2—2 of Figure 1.

Figure 3 is an end view of one of the clamps for use with "wire" wheels.

Like characters of reference refer to like parts in all views.

Referring to the drawing in detail, 10 represents the felly of an automobile wheel, 11 represents the spokes, and 12 the tire, all of which are shown as of the usual well known type. A band or shoe of canvas or other fabric of a similar nature is shown at 13 covering the tread surface of the tire and provided on each side with eyelets 14.

The preferred form of clamp for wheels having wooden spokes comprises four semi-circular members 15, two being placed on each side of the wheel and each member 15 on one side being secured to its mate on the other side by bolts 16. The members 15 are curved at various parts so as to fit snugly about the spokes 11 and each is provided with two lugs 17 and 18 at each spoke. A chain 19 is secured to each lug 17 and to a respective one of the eyelets 14.

Short lengths of rope are shown at 20 provided with coupling links or hooks 21 by means of which they may be secured to the lugs 18 as shown in the drawing.

When the device is to applied to a wheel having wire spokes, a clamp such as shown in Figure 3 is used. This clamp comprises two jaw members 22 adapted to be pressed into gripping contact with the felly by a thumb screw 23. The jaw members 22 are provided with lugs 24 having apertures for securing the chains 19 and ropes 20.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In a device of the class described, the combination with an automobile wheel and tire, of a fabric facing for said tire, clamps adapted to be secured to the spokes of said wheel and provided with bosses, and securing elements co-operative with said bosses for retaining said facing in place.

In testimony whereof I have affixed my signature.

CHARLES O. BODE.